United States Patent
Lebel et al.

(10) Patent No.: US 9,624,829 B2
(45) Date of Patent: Apr. 18, 2017

(54) COGEN HEAT LOAD MATCHING THROUGH REHEAT AND CAPACITY MATCH

(71) Applicant: INDUSTRIAL TURBINE COMPANY (UK) LIMITED

(72) Inventors: Jean-Francois Lebel, Beaconsfield (CA); Carl Carson, Montreal (CA)

(73) Assignee: INDUSTRIAL TURBINE COMPANY (UK) LIMITED (GB)

( * ) Notice: Subject to any disclaimer, the term of this patent is extended or adjusted under 35 U.S.C. 154(b) by 504 days.

(21) Appl. No.: 14/135,532

(22) Filed: Dec. 19, 2013

(65) Prior Publication Data
US 2014/0250903 A1    Sep. 11, 2014

Related U.S. Application Data

(60) Provisional application No. 61/785,950, filed on Mar. 14, 2013, provisional application No. 61/773,100, (Continued)

(51) Int. Cl.
*F02C 3/10* (2006.01)
*F02C 6/00* (2006.01)
(Continued)

(52) U.S. Cl.
CPC ........... *F02C 3/10* (2013.01); *F02C 6/003* (2013.01); *F02C 6/18* (2013.01); *F02C 9/54* (2013.01); *Y02E 20/14* (2013.01); *Y02E 20/16* (2013.01)

(58) Field of Classification Search
CPC .... F02C 6/003; F02C 9/54; F02C 3/14; F02C 3/165; F02C 3/16; F02C 3/10; F05D 2270/303
(Continued)

(56) References Cited

U.S. PATENT DOCUMENTS 3,315,467 A     4/1967   De Witt
3,777,479 A *   12/1973  Hagen .................... F02C 9/54
                                                   60/235

(Continued)

FOREIGN PATENT DOCUMENTS

CN       101498240 A     8/2009
GB          2373299      9/2002
(Continued)

OTHER PUBLICATIONS

Int'l Search Report for PCT/US2013/077465 mailed May 26, 2014.
(Continued)

*Primary Examiner* — Phutthiwat Wongwian
*Assistant Examiner* — Alain Chau
(74) *Attorney, Agent, or Firm* — Beusse Wolter Sanks & Maire

(57) ABSTRACT

One example of a gas turbine engine may include a gas generator, a reheat combustor that is disposed downstream of the gas generator, and a power turbine that is disposed downstream of the reheat combustor and includes a plurality of nozzle guide vanes. The reheat combustor is configured to increase a fuel flow so as to increase a temperature of the reheat combustor and match a required exhaust temperature. The nozzle guide vanes are configured to increase a real capacity at a power turbine inlet in proportion with the required exhaust temperature. A constant apparent capacity at a gas generator exit upstream of the reheat combustor remains constant, in response to proportionately increasing the temperature and the real capacity with respect to one another.

14 Claims, 3 Drawing Sheets

Related U.S. Application Data filed on Mar. 5, 2013, provisional application No. 61/773,103, filed on Mar. 5, 2013.

(51) Int. Cl.
*F02C 9/54* (2006.01)
*F02C 6/18* (2006.01)

(58) Field of Classification Search
USPC .................................................... 60/774, 792
See application file for complete search history.

(56) References Cited

U.S. PATENT DOCUMENTS

| | | | |
|---|---|---|---|
| 3,842,595 | A | 10/1974 | Smith et al. |
| 4,009,569 | A | 3/1977 | Kozlin |
| 4,030,288 | A | 6/1977 | Davis et al. |
| 4,222,235 | A | 9/1980 | Adamson et al. |
| 4,418,528 | A | 12/1983 | Pellow |
| 4,773,213 | A | 9/1988 | Krukoski et al. |
| 4,896,499 | A | 1/1990 | Rice |
| 5,022,145 | A | 6/1991 | Brawerman et al. |
| 5,184,460 | A | 2/1993 | Franciscus et al. |
| 5,313,782 | A | 5/1994 | Furutsuchi et al. |
| 5,347,806 | A * | 9/1994 | Nakhamkin .......... F01K 21/047 60/39.17 |
| 5,524,430 | A | 6/1996 | Mazeaud et al. |
| 5,911,680 | A | 6/1999 | Takeoka |
| 5,921,075 | A | 7/1999 | Shimoyama et al. |
| 6,079,197 | A | 6/2000 | Attia |
| 6,691,519 | B2 | 2/2004 | Little |
| 6,817,187 | B2 * | 11/2004 | Yu .......................... F02C 3/365 60/39.17 |
| 7,254,951 | B2 | 8/2007 | Lockwood, Jr. |
| 7,404,294 | B2 * | 7/2008 | Sundin ................. F01D 17/162 60/39.281 |
| 8,006,477 | B2 | 8/2011 | Dinu |
| 8,256,202 | B1 | 9/2012 | Paulino |
| 2002/0148213 | A1 | 10/2002 | Yu |
| 2007/0033945 | A1 | 2/2007 | Goldmeer et al. |
| 2007/0157595 | A1 * | 7/2007 | Lockwood ............... F02C 1/04 60/39.17 |
| 2009/0064654 | A1 | 3/2009 | Kirzhner et al. |
| 2009/0301054 | A1 | 12/2009 | Simpson et al. |
| 2012/0006031 | A1 | 1/2012 | Lebegue et al. |
| 2012/0017601 | A1 | 1/2012 | Eroglu et al. |
| 2012/0324903 | A1 * | 12/2012 | Dewis ..................... F02C 7/143 60/772 |
| 2013/0104521 | A1 * | 5/2013 | Kupratis ................... F02C 9/52 60/204 |
| 2014/0250904 | A1 | 9/2014 | Lebel |

FOREIGN PATENT DOCUMENTS

| | | |
|---|---|---|
| GB | 2373299 A | 9/2002 |
| GB | 2373299 A | 9/2002 |
| JP | S337755 | 9/1958 |
| JP | S42023846 | 11/1967 |
| JP | H03100331 A | 4/1991 |
| JP | H03175117 A | 7/1991 |
| JP | H05179904 A | 7/1993 |
| JP | 2001140657 A | 5/2001 |
| JP | 2002285860 A | 10/2002 |
| JP | 2003083081 A | 3/2003 |
| JP | 2011102548 A | 5/2011 |
| JP | 2016510851 A | 4/2016 |
| WO | 03021097 A1 | 3/2003 |

OTHER PUBLICATIONS

Bringhenti C. et al: "Study of an Industrial Gas Turbine With Turbine Stators Variable Geometry", IX Congresso Brasileiro De Engenharia E Ciências Térmicas 9th Brazilian Congress of Thermal Engineering and Sciences, ABCM Proceedings of the ENCIT 2002, Paper CIT02-0885XP055117077, Retrieved from the Internet: URL:http://www.abcm.org.br/pt/wp-content/anais/encit/2002/Paper-title/31/CIT02-0885.PDF [retrieved on May 8, 2014]; 2002.
EP Examination Report dated Jul. 13, 2016, for EP application No. 13824059.3.
JP Office Action dated Aug. 8, 2016, for JP application No. 2015561602.
JP Office Action dated Sep. 5, 2016, for JP application No. 2015561332.
CN Office Action dated Nov. 10, 2016, for Chinese patent application No. 201380075660.X.
CA Office Action dated Nov. 22, 2016, for Canadian patent application No. 2,903,094.

* cited by examiner

COGEN HEAT LOAD MATCHING THROUGH REHEAT AND CAPACITY MATCH

CROSS-REFERENCE TO RELATED APPLICATIONS

This application claims the benefit of U.S. Provisional Application No. 61/785,950, filed Mar. 14, 2013, U.S. Provisional Application No. 61/773,103, filed Mar. 5, 2013, and U.S. Provisional Application No. 61/773,100, filed Mar. 5, 2013.

FIELD OF TECHNOLOGY

Presented is a gas turbine engine for cogeneration systems that produce electricity and heat for a combined cycle power plant, and more particularly to a gas turbine engine that uses a reheat combustor and a power turbine that are configured to match heat load demands of the plant.

BACKGROUND

Combined heat and power generation ("CHP" or "cogen") is the simultaneous generation of electricity and heat by a thermal power station. In particular, the typical power station includes one or more gas turbine engines that generate electricity and emit a certain amount of heat as a byproduct of generating electricity. CHP captures and uses some or all of the heat for heating hospitals, commercial buildings or various other buildings that are located geographically close to the power station. As another example, CHP can also be used for heating a district water supply.

Two common types of gas turbine engines may include those originally designed for industrial and power generation applications ("industrial machines") and those typically derived from aeronautical engines ("aeroderivatives"). The former may have a heavy weight and robust construction for a long life with less frequent maintenance overhauls. The latter may start up, change loads and shut down more quickly than the industrial machines. Furthermore, aeroderivatives may have higher pressure ratios, higher efficiencies and lower exhaust temperatures than the industrial machines and thus may produce less steam in the combined cycle and CHP configuration. Potential obstacles to CHP can include matching heat and electric loads in quantity and timing as required by the power station.

Therefore, a need exists for a gas turbine engine that meets any heat load requirement by using a reheat combustor and a power turbine having a sufficient set of nozzle guide vanes ("NGVs"), or, alternatively if the heat load is variable, by using variable nozzle guide vanes ("VNGV").

BRIEF DESCRIPTION OF THE DRAWINGS

While the claims are not limited to a specific illustration, an appreciation of the various aspects is best gained through a discussion of various examples thereof. Referring now to the drawings, exemplary illustrations are shown in detail. Although the drawings represent the illustrations, the drawings are not necessarily to scale and certain features may be exaggerated to better illustrate and explain an innovative aspect of an example. Further, the exemplary illustrations described herein are not intended to be exhaustive or otherwise limiting or restricted to the precise form and configuration shown in the drawings and disclosed in the following detailed description. Exemplary illustrations are described in detail by referring to the drawings as follows:

DETAILED DESCRIPTION

Figure 1:
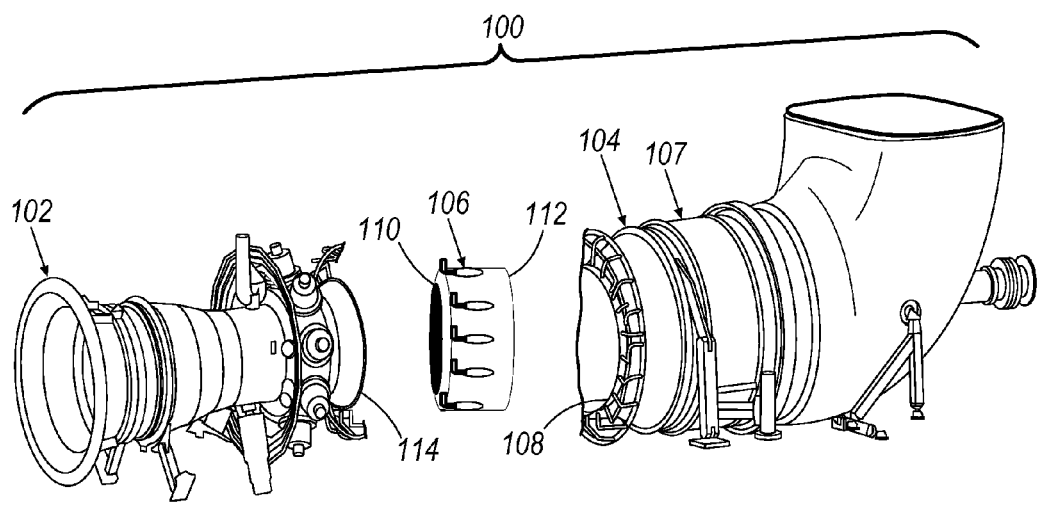
FIG. 1 illustrates an exploded view of one exemplary embodiment of a gas turbine engine that includes a reheat combustor and a power turbine, which cooperate with one another to provide cogen heat load matching through reheat and capacity match.

Referring now to the discussion that follows and also to the drawings, illustrative approaches are shown in detail. Although the drawings represent some possible approaches, the drawings are not necessarily to scale and certain features may be exaggerated, removed, or partially sectioned to better illustrate and explain the present disclosure. Further, the descriptions set forth herein are not intended to be exhaustive or otherwise limit or restrict the claims to the precise forms and configurations shown in the drawings and disclosed in the following detailed description.

One example of a gas turbine engine may include a gas generator, a reheat combustor that is disposed downstream of the gas generator, and a power turbine that is disposed downstream of the reheat combustor and includes a plurality of nozzle guide vanes. The reheat combustor is configured to increase a fuel flow so as to increase a temperature of the reheat combustor and match a required exhaust temperature. The nozzle guide vanes are configured to increase a real capacity at a power turbine inlet in proportion with the required exhaust temperature. A constant apparent capacity at a gas generator exit upstream of the reheat combustor remains constant, in response to proportionately increasing the temperature and the real capacity with respect to one another.

Another example of a gas turbine engine may include a gas generator, a reheat combustor disposed downstream of the gas generator, and a power turbine downstream of the reheat combustor. The reheat combustor is configured to increase a fuel flow so as to increase a temperature of the reheat combustor and match a required exhaust temperature. The power turbine has a plurality of nozzle guide vanes that are configured to match a heat load for a cogeneration plant. The nozzle guide vanes are variable area nozzle guide vanes ("VNGVs") that are configured to be modulated and provide a plurality of real capacities at a power turbine inlet corresponding to the increased temperature of the reheat combustor. Thus, the gas turbine engine matches a variable heat load for a cogeneration plant and maintains a constant apparent capacity at a gas generator exit upstream of the reheat combustor.

An exemplary method of matching heat load that is required by a cogen power station can include increasing a fuel flow to a reheat combustor so as to increase a temperature of the reheat combustor and match a required exhaust temperature. The method can also include increasing a real capacity at a power turbine inlet downstream of the reheat combustor, in proportion with the increased temperature of the reheat combustor. In addition, the method can include maintaining a constant apparent capacity at a gas generator exit upstream of the reheat combustor, in response to proportionately increasing the real capacity and the temperature with respect to one another.

Referring to FIG. 1, one example of a gas turbine engine 100 can generally include a gas generator 102, a power turbine 104 and a reheat combustor 106 disposed between the same. In one example, the power turbine 104 may have a set of nozzle guide vanes 107 ("NGVs") configured to provide a real capacity or volumetric flow rate through the power turbine 104 at an inlet 108 of the power turbine 104. In particular, the sets of NGVs may be configured to provide a real capacity that is within a range between an upper capacity and a lower capacity, which are associated with an optimal capacity for a heat load demanded by a cogen power station. The optimal capacity for the cogen power station heat load can be between two sets of NGVs in store. In this case, two or more NGV sets can be mixed and matched such that, for example, one set provides an available upper real capacity and another set provides an available lower real capacity, and a resulting real capacity can produce the corresponding heat load demanded by the cogen station.

Figure 2:
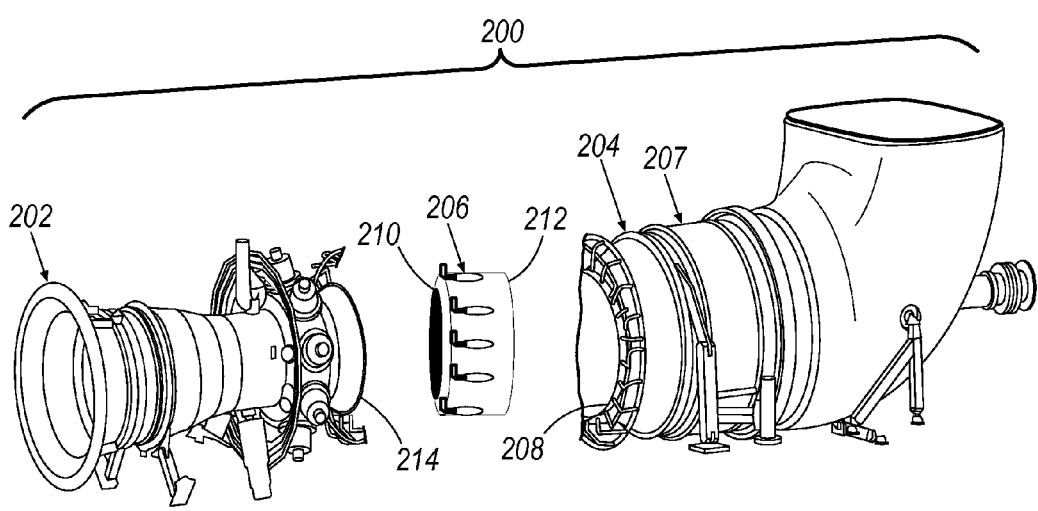
FIG. 2 illustrates an exploded view of another exemplary embodiment of a gas turbine engine that includes a power turbine, which has variable area nozzle guide vanes.

As shown in FIG. 2, another exemplary gas turbine engine 200 has a power turbine 204 and is substantially similar to the gas turbine engine 100 of FIG. 1, which has the power turbine 104 with similar components identified in corresponding numbers in the 200 series. However, the power turbine 204 can have a set of variable area nozzle guide vanes 207 ("VNGVs") that are configured to be modulated to provide a plurality of real capacities, and match a variable heat load demanded by a cogen power station, in contrast to the power turbine 104 of FIG. 1 having two or more combined fixed area NGV sets that are configured to provide only one real capacity. In this respect, the VNGVs can be modulated or adjusted to in turn adjust the real capacity or volumetric flow rate through the power turbine inlet 208 and match a variable heat load of a cogen power station. For instance, the cogen power station may require a heat load during the daytime that is higher than a heat load required during the night. Thus, the VNGVs can be opened or modulated to increase a real capacity or volumetric flow rate at the power turbine inlet during the daytime, which is higher than a real capacity or volumetric flow rate that the VNGVs provide during the night.

Referring back to FIG. 1, the reheat combustor 106 may have an entry point 110 and an exit point 112. The entry point 110 is associated with a gas generator exit 114 and the corresponding apparent capacity or volumetric flow through the power turbine 104. Furthermore, the exit point 112 is associated with the power turbine inlet 108 and the corresponding real capacity or volumetric flow through the power turbine 104. Between the entry and exit points 110, 112, the reheat combustor 106 can have a negligible pressure drop ($P_2=P_1$), the combustion process may be up to 100% efficient, and no cooling air may be extracted or injected between the two planes ($W1=W_2-W_{fuel}$). Based on these conditions, the downstream turbine capacity, Q, for the turbine engine 100 can be expressed through the set of equations below.

A flow function associated with the entry point 110 and the apparent capacity $Q_1$ of the power turbine 104 at the gas generator (GG) exit flow may be:

$$Q_1 = W_1\sqrt{T_1}/P_1 \quad \text{(Equation 1)}$$

Furthermore, a flow function corresponding to the exit point 112 and the real capacity $Q_2$ of the power turbine 104 at its inlet 108 may be:

$$Q_2 = W_2\sqrt{T_2}/P_2 \quad \text{(Equation 2)}$$

Assuming $P_2=P_1$, equation 2 becomes $$Q_2 = W_2\sqrt{T_2}/P_1$$

$$P_1 = W_2\sqrt{T_2}/Q_2$$

Substituting in equation 1:

$$\begin{aligned} Q_1 &= W_1\sqrt{T_1}/(W_2\sqrt{T_2}/Q_2) \\ &= (W_1/W_2) * (\sqrt{T_1}/\sqrt{T_2}) * Q_2 \\ &= ((W_2 - W_{fuel})/W_2) * (\sqrt{T_1}/\sqrt{T_2}) * Q_2 \\ &= (1 - (W_{fuel}/W_2)) * (\sqrt{T_1}/\sqrt{T_2}) * Q_2 \end{aligned}$$

Assuming fuel flow is 2% of core flow for the sake of this example, $W_{fuel}=2\%$ of $W_2$ $$Q_1 = 0.98 * (\sqrt{T_1}/\sqrt{T_2}) * Q_2 \quad \text{(Equation 3)}$$

It can therefore be seen from equation 3 that it is possible to raise the reheat temperature $T_2$, and hence the exhaust temperature for matching heat load requirements by proportionately increasing the real capacity $Q_2$ and maintaining the apparent capacity $Q_1$ at a constant value.

Figure 3:
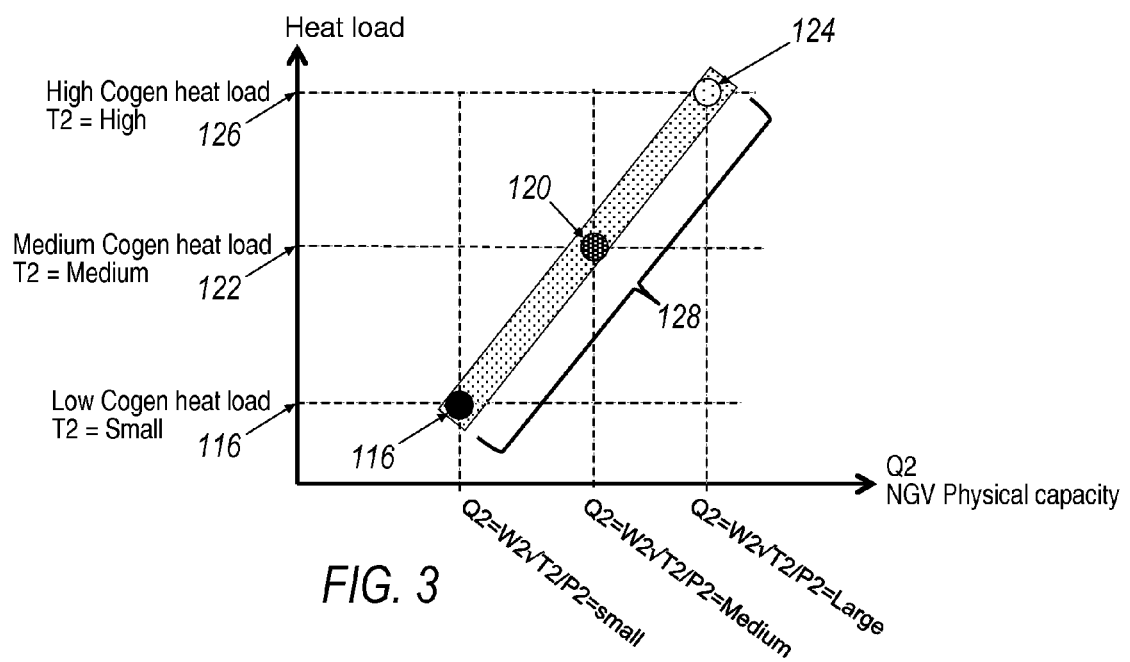
FIG. 3 illustrates a graph of the cogeneration heat load corresponding to a real capacity of the power turbine of FIG. 1.

FIG. 3 illustrates operation of the gas turbine engine 100 pursuant to Equation 3. Moreover, when the heat load through the operational cycle of the gas generator 102 can vary, it can be seen from equation 3 that maintaining the desired apparent capacity at the gas generator exit 114 could be achieved with a power turbine 104 that is configured to provide variable real capacity $Q_2$. In this respect, a single gas generator can be used for multiple applications, which can in turn minimize inventory and engine variant and also improve cogen station efficiency and power by tailoring the gas turbine cycle to the heat load requirements.

FIG. 3 illustrates various heat loads provided by multiple gas turbine engines. For instance, data entry 116 represents one exemplary gas engine turbine in a Cogen plant with low cogen heat load supply requirement, having combined sets of NGVs that are configured to provide a small capacity $Q_2$, so as to maintain the required gas generator apparent capacity $Q_1$ at a specified value with a low reheat exit temperature $T_2$, which is sufficient to match or satisfy a first heat load requirement 118 of a fixed heat load plant. Data entry 120 represents another exemplary gas engine turbine with medium cogen heat load having combined sets of NGVs that are configured to provide a medium capacity $Q_2$, so as to maintain the required gas generator apparent capacity $Q_1$ at the same specified value as case 116 with a medium reheat exit temperature $T_2$, which is sufficient to match or satisfy a second heat load requirement 122 of a fixed heat load plant. Data entry 124 represents still another exemplary gas engine turbine with high cogen heat load having combined sets of NGVs that are configured to provide a high capacity $Q_2$, so as to maintain the required gas generator apparent capacity $Q_1$ at same specified value as case 116 with a high reheat exit temperature $T_2$, which is sufficient to match or satisfy a third heat load requirement 126 of a fixed heat load plant. In addition, continuum bar 128 represents one exemplary gas turbine engine having variable area nozzle guide vanes that are configured to modulate real capacity $Q_2$ between case 116 and case 124 in order to maintain the gas generator apparent capacity $Q_1$ at a constant specified value in response to a combination of: varying reheat exit temperature $T_2$ varying from a low reheat exit temperature 118 to a high reheat temperature 126 in response to the required cogen plant exhaust heat requirement. This variable capacity will be modulated proportionally with the reheat exit temperature which itself is correlated to reheat fuel flow, to comply with equation 3 above.

Figure 4:
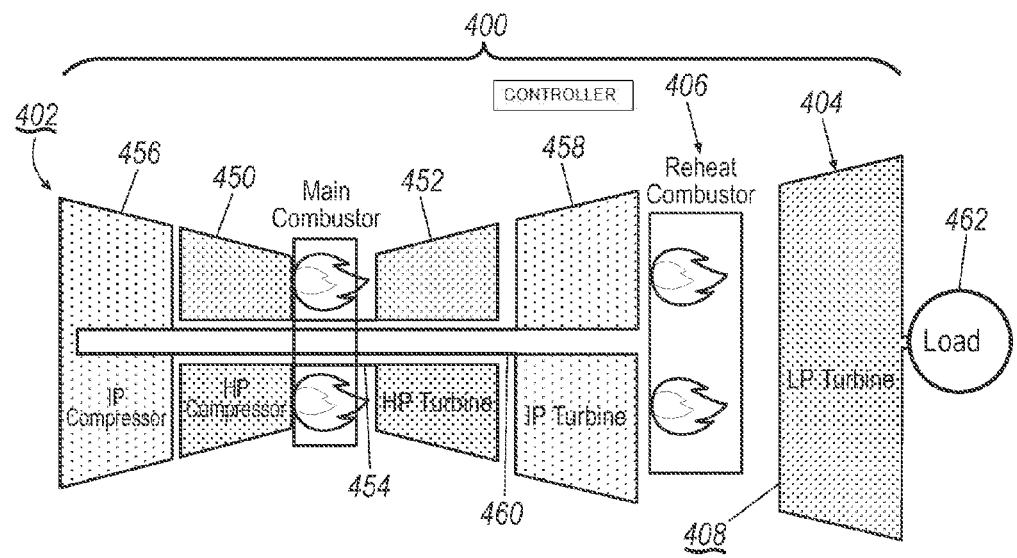
FIG. 4 is a schematic view of the gas turbine engine shown in FIG. 1.

Referring to FIG. 4, a two-shaft gas generator 402 communicates with a reheat combustor 406, which in turn communicates with a power turbine 404 or low pressure turbine. The gas generator 402 includes a high pressure compressor 450, a high pressure turbine 452 and a first shaft 454 in connection between the high pressure compressor 450 and the high pressure turbine 452. The gas generator 402 can further include an intermediate pressure compressor 456, an intermediate pressure turbine 458 and a second shaft 460 in connection between the intermediate pressure compressor 456 and the intermediate pressure turbine 458. Moreover, the low pressure turbine 404 may be disposed downstream of the intermediate pressure turbine 458 and attached to an external load 462. The first and second shafts 454, 460 are separated from one another.

The low pressure turbine or power turbine 404 can have several different sets of components, e.g. nozzle guide vanes, and each set can produce a different real capacity $Q_2$ at the power turbine inlet 408. Since the ratio of apparent power turbine capacity to real power turbine capacity depends on the desired amount of temperature rise in the reheat combustor 406, a set of power turbine components that is configured to provide a larger capacity will allow for a higher reheat temperature $T_2$, when capacity $Q_1$ at gas generator exit 414 remains constant. Thus, a higher exhaust temperature for a cogen power station can be provided when high temperatures are needed.

Figure 5:
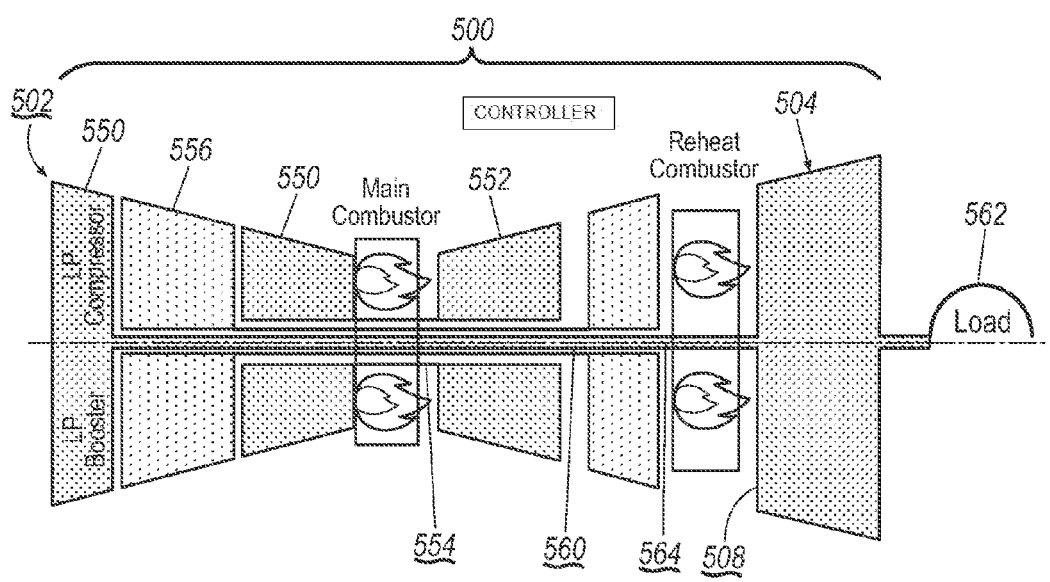
FIG. 5 is a schematic view of another exemplary gas turbine engine.

Referring to FIG. 5, a three-shaft gas turbine engine 500 has a low pressure turbine 504 and is substantially similar to the two-shaft gas turbine engine 400 of FIG. 4, which has the low pressure turbine 404. However, the gas turbine engine 500 further includes a low pressure compressor 550, and the low pressure turbine 504 is attached to the low pressure compressor 550 by a third shaft 564. The low pressure turbine is further attached to the external load 562. Examples of the external load 562 can include a generator, a gas compressor or a refrigeration device. The low pressure turbine 504 can have several different sets of turbine components, e.g. nozzle guide vanes, and each set can produce a different real capacity at the power turbine inlet 508. Since the ratio of apparent turbine capacity to real turbine capacity depends on the amount of temperature rise in the reheat module, the larger capacity set will allow for a higher reheat temperature $T_2$ and hence a higher exhaust temperature for a cogen power station where high temperatures are needed.

It will be appreciated that the aforementioned method and devices may be modified to have some components and steps removed, or may have additional components and steps added, all of which are deemed to be within the spirit of the present disclosure. Even though the present disclosure has been described in detail with reference to specific embodiments, it will be appreciated that the various modifications and changes can be made to these embodiments without departing from the scope of the present disclosure as set forth in the claims. The specification and the drawings are to be regarded as an illustrative thought instead of merely restrictive thought.

What is claimed is:

1. A gas turbine engine, comprising:
   a gas generator;
   a reheat combustor downstream of the gas generator;
   a power turbine downstream of the reheat combustor and having a plurality of variable area nozzle guide vanes; and
   a controller configured to operate the gas turbine engine such that:
   the reheat combustor is configured to increase a fuel flow so as to increase a temperature of the reheat combustor and match a required exhaust temperature;
   the plurality of variable area nozzle guide vanes are configured to increase a real capacity at a power turbine inlet in proportion with the required exhaust temperature, wherein the real capacity is a capacity of the power turbine based on flow parameters at the power turbine inlet; and
   a constant apparent capacity at a gas generator exit upstream of the reheat combustor remains constant in response to proportionately increasing the temperature and the real capacity, wherein the apparent capacity is a capacity of the power turbine based on flow parameters at a gas generator exit.

2. The gas turbine engine of claim 1, wherein a position of the plurality of variable area nozzle guide vanes in turn determines a temperature of an exhaust gas when the apparent capacity remains constant.

3. The gas turbine engine of claim 1, wherein the gas generator is a two-shaft gas generator that communicates with the reheat combustor, which in turn communicates with the power turbine.

4. The gas turbine engine of claim 3, wherein the two-shaft gas generator comprises:
   a high pressure compressor;
   a high pressure turbine;
   a first shaft in connection between the high pressure compressor and the high pressure turbine;
   an intermediate pressure compressor;
   an intermediate pressure turbine;
   a second shaft in connection between the intermediate pressure compressor and the intermediate pressure turbine; and
   the power turbine downstream of the intermediate pressure turbine and attached to an external load;
   wherein the first and second shafts are separated from one another.

5. The gas turbine engine of claim 1, wherein the gas generator is a three-shaft gas generator that communicates with the reheat combustor, which in turn communicates with the power turbine.

6. The gas turbine engine of claim 5, wherein the three-shaft gas generator comprises:
   a high pressure compressor;
   a high pressure turbine;
   a first shaft in connection between the high pressure compressor and the high pressure turbine;
   an intermediate pressure compressor;
   an intermediate pressure turbine;
   a second shaft in connection between the intermediate pressure compressor and the intermediate pressure turbine;
   a low pressure compressor;
   the power turbine attached to an external load; and
   a third shaft in connection between the low pressure compressor and the power turbine;

wherein the first, second and third shafts are not attached to one another.

7. The gas turbine engine of claim 6, wherein the external load is one of a generator, a gas compressor and a refrigeration device.

8. The gas turbine engine of claim 1, wherein the reheat combustor has no pressure drop thereacross from the gas generator exit to the power turbine inlet.

9. The gas turbine engine of claim 1, wherein the plurality of variable area nozzle guide vanes are configured to provide a real capacity at the power turbine inlet that is within a range between an upper real capacity and a lower real capacity, that define a pair of outermost bounds for an optimal capacity associated with a heat load demanded by a cogen power station.

10. A gas turbine engine, comprising:
a gas generator;
a reheat combustor disposed downstream of the gas generator;
a power turbine downstream of the reheat combustor having plurality of variable area nozzle guide vanes; and
a controller configured to operate the gas turbine engine such that:
the reheat combustor is configured to increase a fuel flow to so as to increase a temperature of the reheat combustor and match a required exhaust temperature;
the plurality of variable area nozzle guide vanes are configured to match a predetermined heat load for a cogeneration plant;
the plurality of variable area nozzle guide vanes are configured to be modulated and provide a plurality of real capacities at a power turbine inlet corresponding to the increased temperature of the reheat combustor, so as to match a variable heat load for the cogeneration plant and maintain a constant apparent capacity at a gas generator exit upstream of the reheat combustor,
wherein the plurality of real capacities are capacities of the power turbine based on flow parameters at the power turbine inlet, and
wherein the plurality of apparent capacities are capacities of the power turbine based on flow parameters at an outlet of the gas generator.

11. The gas turbine engine of claim 10, wherein a position of the plurality of variable area nozzle guide vanes in turn determines a temperature of an exhaust gas when the apparent capacity remains constant.

12. The gas turbine engine of claim 10, wherein the gas generator is one of a two-shaft gas generator and a three-shaft gas generator.

13. A method of matching a heat load demand for a cogeneration plant, the method comprising:
increasing a fuel flow to a reheat combustor so as to increase a temperature of the reheat combustor and match a required exhaust temperature;
increasing a real capacity at a power turbine inlet of a power turbine downstream of the reheat combustor, in proportion with the increased temperature of the reheat combustor, wherein the real capacity is a capacity of the power turbine based on flow parameters at the power turbine inlet; and
maintaining a constant apparent capacity at a gas generator exit upstream of the reheat combustor, in response to proportionately increasing the real capacity and the temperature with respect to one another, wherein the apparent capacity is a capacity of the power turbine based on flow parameters at an outlet of a gas generator,
wherein increasing the real capacity and maintaining the constant apparent capacity are achieved by selecting an angle of variable area nozzle guide vanes that is appropriate to accommodate increased flow generated by the reheat combustor.

14. The method of claim 13, further comprising opening the variable area nozzle guide vanes to increase a real capacity at the power turbine inlet.

* * * * *